June 27, 1944. G. N. HARCOURT ET AL 2,352,195
METHOD AND APPARATUS FOR REMOVING CONTINUOUS FILM
OF MATERIAL FROM THE SURFACE OF DRYING DRUMS
Filed Sept. 20, 1941 5 Sheets-Sheet 1

INVENTORS
Guy N. Harcourt and
Charles O. Lavett
by Popp and Popp
ATTORNEYS

June 27, 1944.   G. N. HARCOURT ET AL   2,352,195
METHOD AND APPARATUS FOR REMOVING CONTINUOUS FILM
OF MATERIAL FROM THE SURFACE OF DRYING DRUMS
Filed Sept. 20, 1941   5 Sheets-Sheet 2

INVENTORS
Guy N. Harcourt and
Charles O. Lavett
by Popp and Popp
ATTORNEYS

Patented June 27, 1944

2,352,195

UNITED STATES PATENT OFFICE 2,352,195

METHOD AND APPARATUS FOR REMOVING A CONTINUOUS FILM OF MATERIAL FROM THE SURFACE OF DRYING DRUMS

Guy N. Harcourt and Charles O. Lavett, Buffalo, N. Y., assignors to Buffalo Foundry & Machine Co., Buffalo, N. Y., a corporation of New York Application September 20, 1941, Serial No. 411,710

21 Claims. (Cl. 34—20)

This invention relates to the method and apparatus for removing a continuous film of material dried on the surface of a revolving drum and more particularly to such a method and apparatus for materials which are heat sensitive and require rapid cooling or which remain soft or gummy on leaving the hot drying drum and require a substantial cooling period to place them in condition to be handled by the usual conveyer associated with the drum dryer.

The invention is particularly directed to the removal of the continuous film of material dried on the surface of a revolving heated drum of any type and the invention is illustrated as used in conjunction with a double drum atmospheric dryer, the parallel drums of which revolve downward at their point of closest approach and the drums being provided with the usual end boards to form a reservoir above and between the drums for holding the material to be dried. The thickness of the film or coating on the drums in such a dryer is governed mainly by the adjustment of the space or clearance between the drums, and the film adhering to each drum is carried under the drum and upwardly on its rising outer side to a stationary knife or doctor blade which is generally located at the upper outer quarter of the drum periphery and well above the horizontal centerline of the drum. The film of material removed from each drum by the knife or doctor blade descends from the knife and hence moves in a direction opposite to the film carried on the adjacent drum surface, that is, the removed film moves downward and the adjacent drying film on the drum surface moves upward.

In the use of this or any other type of drum dryer, various materials, such as tomato products, malted milk, soy bean waste, distillery slop, etc. as removed from the hot drum by the knife, are soft and gummy although upon sufficient cooling they become relatively hard and brittle and are easily broken down to any desired particle size flake or powder. Due to this soft and gummy nature of these materials when removed from the hot drum surface, such hot product films removed by the knife from the drum surface have a tendency to adhere temporarily to the knife and thus ruffle or crimp until the pressure created by the accumulation before the knife forces the material away from the knife. This gathering of the material increases the thickness of the film as it comes from the drum; reduces the rate of movement of the material to a mere fraction of the rate at which the film is removed from the drum; and greatly increases the time it retains its heat. As a consequence such materials remain soft and are not cooled sufficiently to be brittle when reaching the usual conveyer under the knife. This condition prevents the conveyer from breaking up the material into pieces which can be conveyed and instead the product is wrapped around the conveyer flights and is packed into the trough of the conveyer into a dense mass. The thickness of the film is of minor importance on materials which cool quickly or set and become brittle at fairly high temperatures and which are not heat sensitive so as to be affected by prolonged heating. In such cases the only problem is that of keeping the gummy film moving as it leaves the knife and preventing the same from hanging up on guide shields or other parts of the apparatus.

With materials which have to be brought close to atmospheric temperature in order to become sufficiently cool or brittle, materials which cool slowly or which are sensitive to heat, or materials, the color and quality of which are important factors, increased thickness and slow cooling of the film is a serious problem. The drying rate of the dryer has to be reduced, the drum speed lowered to a point where the film will move at such a rate that it will cool sufficiently to break up and be handled by the conveying means which are usually located below and a short distance from the point of removal by the knives.

On products, such as skim milk, where the drums revolve at comparatively high speed and the dry product film is very light and quite tough while hot, the vapors from the drying film and air currents under the removed film are sufficient to float the removed film clear of the upward moving film adhering to the drum surface. However, on many other products, where the film is heavier, drum speeds lower, or where there is not sufficient vapor or air under the removed film to support it, the downward moving film comes in contact with the partly dried film on the upward moving drum surface, causing rolling of the film at the knife, overheating, caking, retarded cooling and difficulty in handling of the dried product.

To overcome these difficulties in some measure it has become customary to guide the film clear of the drums by means of aprons or shields, and in some instances compressed air has been introduced under these shields in an effort to keep the film moving over the apron. Guiding the film in this manner has proven unsatisfactory on many products for various reasons; the shield must necessarily be set at an angle to the horizontal to facilitate the movement of the film and thus collect and trap some of the vapors from the evaporating film on the drum, heating the shield and retarding the cooling of the material passing over it. If compressed air is introduced under the shield, it mixes with the hot vapors and therefore has very little cooling effect and where the material is of a hygroscopic nature there is a tendency toward reabsorption of moisture from these vapors.

The distance from the point of removal to the conveyers in an atmospheric drum dryer is usually about 3 to 4 feet and with conventional dryers the material must cool sufficiently while traversing this distance. With many materials the drum speed and capacity of the dryer has to be reduced in order to give the removed film sufficient time to cool. Increasing this distance, as by lowering the conveyers, will not, beyond certain limits, be practical as the soft film removed by the knife does not have sufficient strength at the knife to support the weight of a film of any great length. The film therefore tears at the knife when a certain weight has been reached and the whole sheet falls into the conveyer.

In accordance with the present invention, on products removed in sheet form from a hot drying drum which, for various reasons, must be cooled quickly, we have found a very effective means for stretching the hot film gathered by the knife to reduce its thickness and thereby permit more effective and rapid cooling, and also lengthening its path or distance of travel between the knife and the conveyer, thus automatically lengthening the time available for cooling and thereby cool the unbroken stretched film in such lengthened time to a point where it becomes sufficiently brittle to break up for conveying in a conventional manner and for delivering to a flaker or grinder for the purpose of reducing the product to any desired particle size.

It is therefore the principal object of the present invention to so continuously remove a film of material dried on the surface of a revolving heated drum, especially where the film on leaving the hot drum is heat sensitive, gummy or soft, that the film is afforded opportunity to cool and harden while in continuous sheet form.

Another object is to effect such removal through a circuitous path in such manner as to provide adequate time and exposure to secure such cooling and hardening.

Another purpose is to effect such removal past cooling means which accelerate the cooling and hardening of the removed strip or sheet of material.

Another aim is to so continuously remove a film of material dried on the surface of a heated revolving drum as to avoid contact with the film being removed and that portion of the film adhering to the drum surface.

Another purpose is to so continuously remove a film of dried material from the surface of a revolving heated drum as to avoid reheating and moistening of the removed film by the vapors generated and rising from the film being dried on the drum surface.

Another object is to stretch the film after it is removed from the drying drum to decrease crimping by the knife so as to insure removal from the knife in the form of an attenuated film which hardens and cools more rapidly.

Another purpose is to provide cooling means immediately adjacent the knife or doctor blade so that the film is immediately placed in condition to be stretched without danger of tearing.

Another purpose is to so continuously remove a film of material in such manner as to provide a product of uniform quality and of lighter color.

Another aim is to provide a mechanism for so continuously removing a film of material dried on the surface of a revolving heated drum which does not interfere with the ready access to the knives or doctor blades of the drum.

Another object is to provide such a mechanism for continuously removing a film of material dried on the surface of a revolving drum which can be readily regulated to provide the degree and rate of cooling, the degree of stretching and the speed of travel of the removed film in accordance with the particular material being handled, its heat retaining qualities, the room temperatures, the degree of cooling required by the material, its hygroscopic qualities, the temperature and speed of drying on the drying drums, etc.

Another purpose is to provide such a mechanism which is driven in synchronism with the dryer so as to insure uniformity in operation.

Other objects are to provide such a mechanism for continuously removing a film of material dried on the surface of a revolving drum which is comparatively simple and inexpensive in construction, which requires little attention in operation and which will stand up under conditions of severe and constant use without getting out of order or requiring repairs.

Further features of this invention appear in the following description and drawings of apparatus embodying and suitable for the practice thereof, in which drawings.

The invention is shown in conjunction with a double drum atmospheric dryer, although it will be understood that the invention is applicable to any type of revolving drum dryer. The double drum dryer is generally illustrated as comprising two cylindrical drums 20, 20 which have their axes arranged horizontal and parallel and their opposing cylindrical surfaces close together so as to form a downwardly converging space or reservoir therebetween. The main frame of the dryer includes upright end standards 21, 22 at the opposite ends of the drums 20, these drums being provided with horizontal trunnions 23 at each of their ends which are journaled in suitable bearings mounted on the standards 21, 22 of the main frame.

The material to be dried is fed into the reservoir or space between the two drums 20 by any suitable means and is confined in this space or reservoir by the usual end boards 24 which are supported by the end standards 21 and 22 and are held against the opposite end faces of the pair of drums 20 so as to confine the material to be dried in the reservoir or space between the two drums. The drums 20 are rotated in any suitable manner so as to move downwardly at their point of closest approach and thereby carry a film or layer 30 of the material to be dried to the underside of each of the drums, the thickness of these layers 30 being mainly determined by the spacing of the drums 20 from each other, this spacing being preferably rendered adjustable by any suitable means well known in the art. The drums are heated internally and the layers 30 adhering to the drums on passing the point of closest approach of the drums are carried circumferentially around the drums a sufficient distance to dry this material following which the layers 30 are removed from the drums in accordance with the present invention.

The film or coating 30 on each of these drums is shown as removed by the usual knife or doctor blade 31 which is shown as arranged at the upper outer quarter of the corresponding drum and with its downwardly directed edge in engagement with the periphery of the drum for substantially its entire length so as to continuously remove the film from the upwardly rotating adjacent peripheral surface of the drum. The knife or doctor blade 31 is carried by the usual knife holder, the ends of which are shown as supported by eccentrics 32 in the end heads 21, 22, so that the position of each knife or doctor blade 31 can be adjusted by moving the eccentrics 32 to different set positions. The material removed from each of the drums 20 is deposited in a trough 35 arranged alongside each of the drums 20 and having a screw conveyer 36 which conducts the dried material to one end of the dryer from which the material can be conveyed to the usual grinder or flaker (not shown). Each of the troughs 35 is shown as being of generally semicircular form in cross section and as having an outer upwardly extending shield or panel 37 and an inner upwardly extending shield or panel 38, this inner shield being shown as curved at its upper end to generally conform to the curvature of the adjacent drum 20 and as having a laterally bent upper edge which is arranged immediately adjacent and parallel to the line of contact between the corresponding knife or doctor blade 31 and the drum 20. The opposite ends of the trough are enclosed, except for the necessary material discharge opening, by end plates 39.

The present invention is particularly applicable to products removed from each drum 20 in the form of the sheet 30 and which, for various reasons, must be cooled quickly, and involves stretching the hot soft film to reduce its thickness as gathered by the knife and thereby condition it for more effective and rapid cooling; lengthening the path or distance of travel of the removed film from the knife or doctor blade 31 to the conveyer screw 36 and thereby lengthen the time available for cooling; and cooling the unbroken stretched film in such available time to a point where it becomes sufficiently brittle to be broken up by the conveyer screw 36 for delivery to a flaker or grinder for the purpose of reducing the product to any desired particle size. To accomplish this, in accordance with the present invention, the film 30 removed by the knife or doctor blade 31 is passed over one or more cooling cylinders revolving on axes parallel to that of the drum. The cylindrical surface of the cooling cylinder may be solid, perforated or preferably in the form of a coarse mesh wire screen. The cooling of the film passing over this cylinder may be accelerated by various means, preferably by dry, cool air or other gases introduced in such manner as to act directly on the removed film or coating 30.

In the form of the invention shown in Figs. 1-9, each of the cooling cylinders, indicated generally at 40, is shown as composed of a piece of coarse mesh woven wire screen 41 which is wrapped around the rims 42 of a plurality of identical internal supporting wheels or spiders indicated generally at 43, the opposite longitudinal edges of the piece of coarse mesh woven wire screen 41 being overlapped as indicated at 44. These internal supporting wheels or spiders are arranged at spaced intervals the full length of the cylinder 40 and each is shown as having a tubular hub 45 connected by four spokes 46 with its circular rim 42, although it will be understood that any number of spokes could be provided. The outer end of each of the spokes 46 is shown as being formed to provide an enlarged flattened portion 47 which ends are secured, by bolts 48 or in any other suitable manner, to the inwardly projecting flange 49 of an angle bar 50, the other flange 51 of which extends the full length of the cooling cylinder and engages the inner side of the rim 42 of each of the supporting wheels or spiders. The inwardly extending flanges 49 of these angle bars 50 are not, however, continuous but are cut-away, as indicated at 52, to provide for the circulation of cooling air as hereinafter described. The cut-away portions of the flanges 49 extend between the spokes 46 of the several internal supporting wheels or spiders 43 and hence the angle bars 50 can be regarded as strips or bars engaging the inner faces of the rims 42 of the several internal supporting wheels or spiders and provided at spaced intervals with radially inwardly projecting flanges 49, each of which is secured by the bolts 48 to the adjacent spoke 46 of the corresponding internal supporting wheel or spider of the cylinder.

Figure 6:
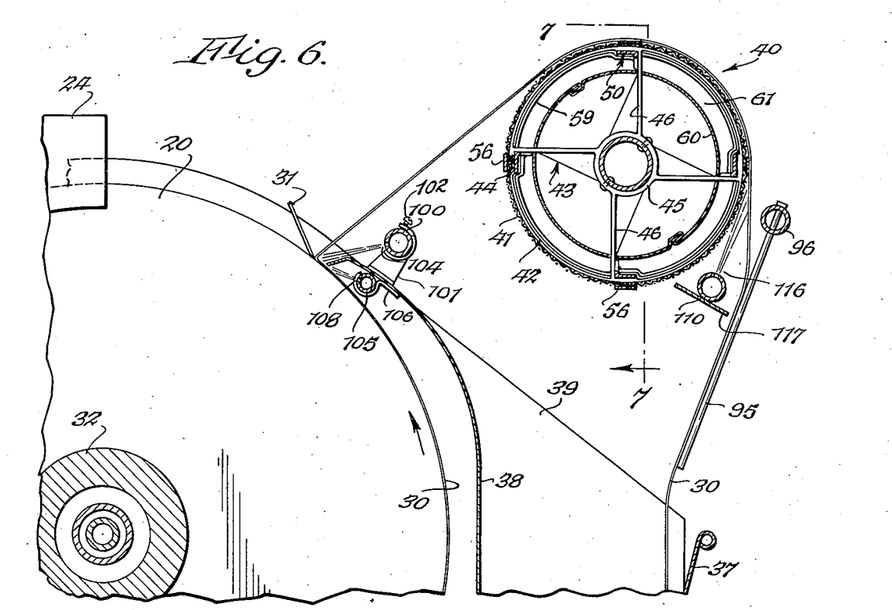
Fig. 6 is an enlarged, fragmentary, vertical, transverse section taken on line 6—6, Fig. 2.
Figures 7, 8, 9:
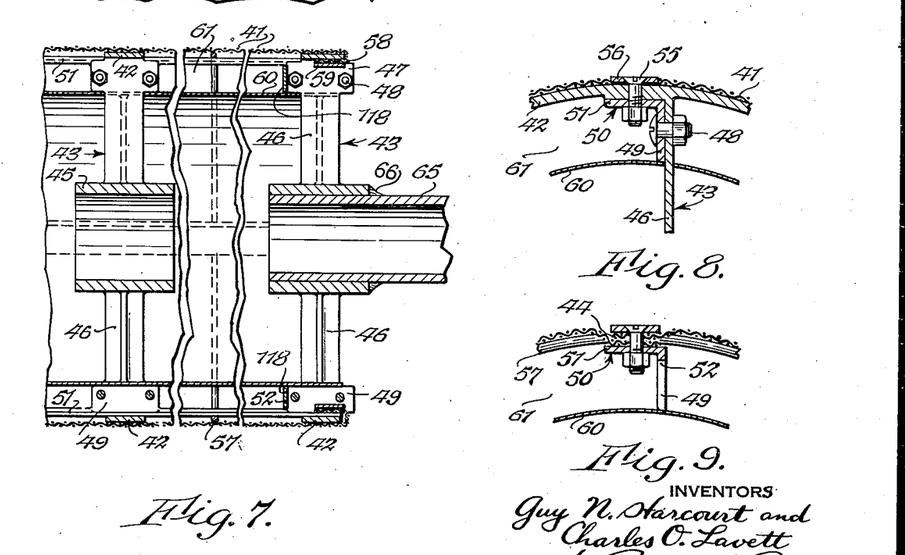
Fig. 7 is a further enlarged, fragmentary, vertical section, taken on line 7—7, Fig. 6.
Figs. 8 and 9 are fragmentary, vertical, transverse sections, through the reel shown in Figs. 6 and 7.
Figures 10, 12:
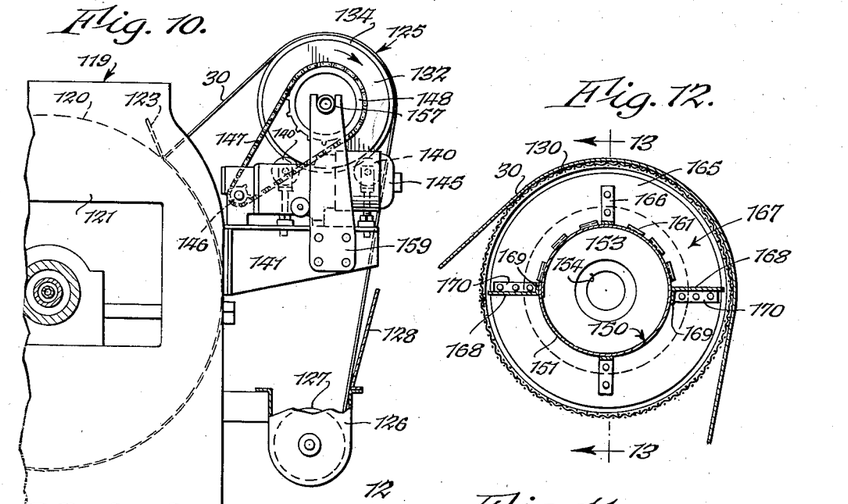
Fig. 10 is a view similar to Fig. 3 and showing a modified form of the invention.
Fig. 12 is a fragmentary, vertical, transverse section taken on line 12—12, Fig. 11.
Figure 11:
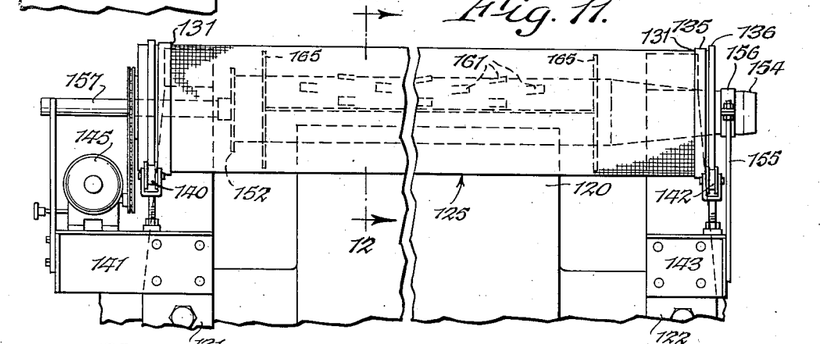
Fig. 11 is a side elevation, similar to Fig. 2, and showing the modified form of the invention illustrated in Fig. 10.

The outer flange 51 of each of the longitudinal angle bars 50 is provided at intervals with holes to receive bolts 55 which, as best shown in Fig. 8, pass through the woven wire screen 41 and through longitudinal retaining strips 56 arranged externally of the woven wire screen 41 thereby securely holding the woven wire screen 41 against the rims of the wheels or spiders 43. As shown in Fig. 9, one of the strips 56 is also employed to hold the overlapping edges 44 of the woven wire screen 41 together. Intermediate the internal wheels or spiders 43 circular pieces of wire 57 can be interposed between the angle bars 50 and the woven wire screen 41 so as to prevent the woven wire screen 41 from sagging between the rims of the internal supporting wheels or spiders 43 and maintain the screen in true cylindrical form throughout its length. Each end of the cylindrical woven wire screen 41 can be bent around the rim of the corresponding end supporting wheel or spider 43, as indicated at 58 in Fig. 7, and these inturned ends 58 can be held against the internal face of the corresponding rim 42 by metal strips 59, as best shown in Figs. 6 and 7 and which can be secured in any suitable manner.

For the purpose of obtaining the desired circulation of cooling air, as hereinafter described, the spokes 46 of the several internal supporting wheels or spiders 43 for the cooling cylinder also support an internal imperforate sheet metal cylinder 60 which can be made of sectional form in any suitable manner to bear against the inner edges of the enlarged portions 47 provided at the outer end of each of the spokes 46. The sheet metal cylinder 60 extends the full length of the cooling cylinder 40 and it will therefore be seen that this internal sheet metal cylinder 60 forms an annular passage 61 between it and the cylindrical woven wire screen 41, air being free to circulate circumferentially through this space and through the cut-away portions 52 of the longitudinal angle bars 50 in a manner hereinafter described.

In order to rotatably support the cooling cylinders 40 a tube 65 is inserted into the hub 45 of the endmost internal supporting wheels or spiders 43 of each cooling cylinder and is secured in this hub in any suitable manner as by the welds 66 shown in Fig. 7. Each of the tubes 65 is shown as journaled in a bearing block 70, each of these bearing blocks being provided with upper and lower flanges 71, 72 which are adapted to ride along the outer face of a post 73 provided at each corner of the dryer. The purpose of this mounting for the four bearing blocks 70 is to permit the entire cooling cylinder 40 at each side of the double drum dryer to be lifted out of the way and provide ready access to the knives or doctor blades 31 for the purpose of adjusting the same.

To this end each of the posts 73 is shown as made in the form of a tube which is rectangular in cross section and provided in that side which guides the adjacent bearing block 70 with a vertical slot 74. The lower end of each of the posts 73 is rigidly secured to the adjacent part of one of the upright standards 21, 22 in which the drying drums 20 are journaled and the posts at each end of the dryer are preferably cross braced at their upper ends by a connecting bar 75. A vertically movable counterweight 80 is arranged within each of the posts 73 and is suspended from one end of a cable 81, this cable passing over a pulley 82 mounted on the upper end of the post and the other end of the cable 81 connecting with an eye 83 on the upper side of the corresponding bearing block 70.

Figures 3, 4, 5:
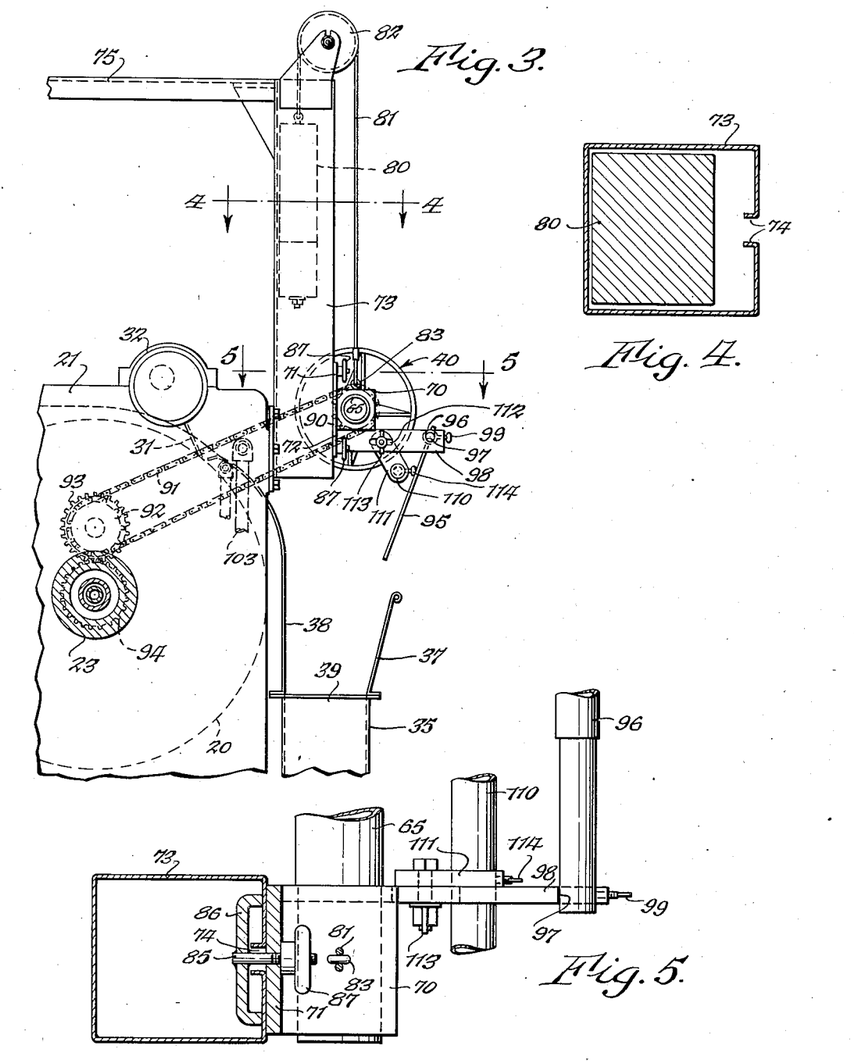
Fig. 3 is a fragmentary, vertical, transverse section taken generally on line 3—3, Fig. 2.
Fig. 4 is an enlarged horizontal section taken on line 4—4, Fig. 3.
Fig. 5 is an enlarged, fragmentary, horizontal section taken on line 5—5, Fig. 3.

The counterweights 80 for each cooling cylinder 40 are, of course, proportioned to substantially balance each other and it will therefore be seen that the operator can readily lift the cooling cylinder 40 at either side of the dryer to the top of the posts 73 and thereby obtain ready access to the knives or doctor blades 31 for the purpose of adjusting the same. In order to facilitate the return of the cooling cylinders 40 to the desired level and to exact parallelism with the drying drums 20, a series of graduations 84 are preferably provided in the outer face of each of the posts 73 which is traversed by the corresponding bearing block 70 and it will therefore be seen that the operator can, by checking these graduations, readily return each drying cylinder 40 into parallel relation to the drying drums 20. After the drying drums have been so properly positioned at the desired elevation, the operator can readily lock each of the bearing blocks 70 to the corresponding post 73 so as to hold these bearing blocks in fixed relation to the drying drums 20. For this purpose the upper and lower flanges 71, 72 of each bearing block 70 are provided with holes which receive threaded studs 85, as best shown in Fig. 5, the inner end of each of these studs being welded to a U-shaped clamp 86 arranged inside of the post 73 and having its legs adapted to engage the inside of that wall of the post 73 which forms the slot 74. The outer threaded end of each of the studs 85 carries a hand wheel 87 which, upon being loosened, releases the clamp 86 from engagement with the post 73 so as to permit the bearing block to slide vertically along the slot 74. It will be seen that the two studs 85 in each slot 74 provides a vertical guide for the corresponding bearing block 70.

Each of the cooling drums 40 is rotated in synchronism with the corresponding drum 20 but at a suitable peripheral speed so as to effect a stretching of the film as hereinafter described. For this purpose, as best shown in Fig. 3, one of the tubular extensions or journals 65 of each of the cooling drums 40 is provided with a sprocket 90 which is connected by a drive chain 91 with a sprocket 92 rotatably mounted on the corresponding upright standard 22 of the dryer in any suitable manner. This sprocket 92 is connected by a gear 93 which meshes with a gear 94 fast to the adjacent journal 23 of the corresponding drum 20. This drive is such that the cooling drums 40 are rotated in the opposite direction as the adjacent drying drums 20.

The continuous film or sheet of material 30 removed from each of the drying drums 20 is placed on the adjacent cooling drum 40 and the continuous film or strip 30 of material is passed inside the shield 37 of the conveyer trough 35 and into this trough by a series of rods 95 which are secured to a tube or pipe 96 which extends parallel with the axes of the cooling and drying drums and is arranged adjacent the downwardly moving side of each cooling drum. The rods 95 are preferably set at an angle, as shown in Fig. 6, so as to guide the continuous film or sheet of material 30 into the conveyer trough. The ends of each of the supporting tubes or pipes 96 for these rods are shown as set in a socket 97 provided in the upper side of an arm 98 which is secured to and projects outwardly from each of the bearing blocks 70, as best shown in Figs. 3 and 5. The desired angular position of the rods 95 is shown as maintained by a set screw 99 screwed into the end of each arm 98 in position to engage the side of the supporting tube or pipe 96.

A feature of the invention is the partial cooling of the film or sheet of material being dried at the line of removal of this film or strip from each drying drum 20 so that the film or sheet is immediately placed in condition for stretching without danger of tearing.

Figure 1:
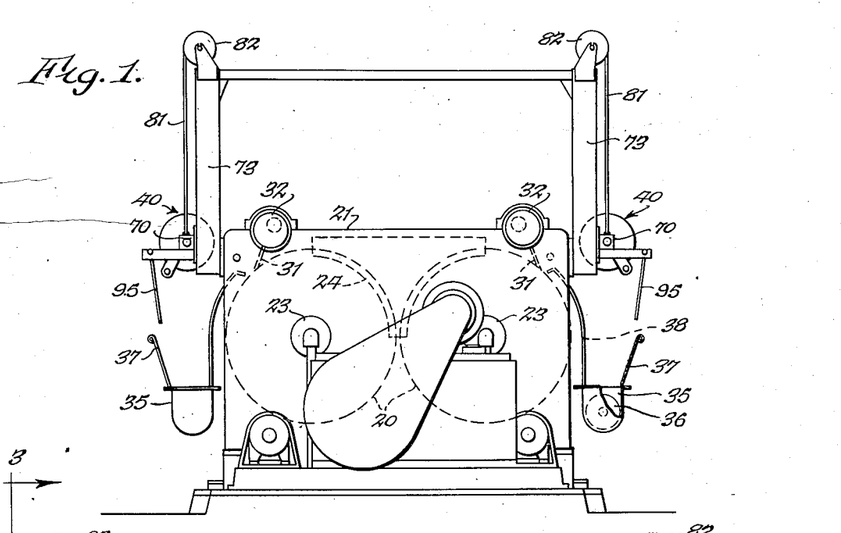
Fig. 1 is an end view of a double drum dryer equipped with a mechanism for continuously removing the films of material dried on the surface of the revolving drums and embodying and adapted to carry out the present invention.
Figure 2:
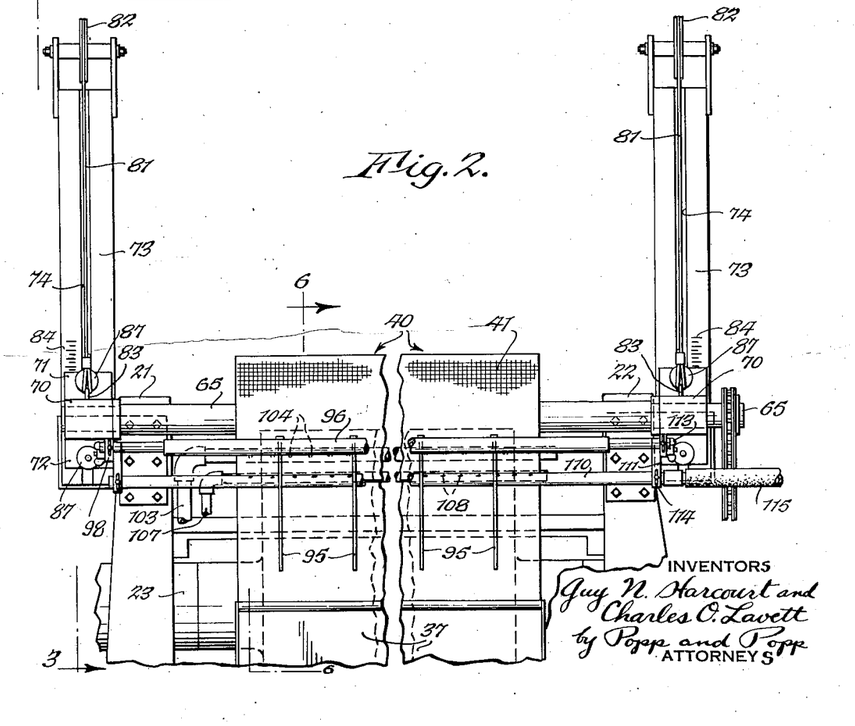
Fig. 2 is an enlarged fragmentary side elevation thereof.

For this purpose a pipe 100 is shown as arranged above the shield 38 and immediately adjacent each doctor blade 31 and parallel with the axis of the adjacent drying drum 20. This pipe is shown as supported in sockets at the upper end of brackets 101 which brackets are suitably secured to the shields 38 of the corresponding conveyer trough 25 and, as best shown in Fig. 6, the pipe 100 is held in the sockets of the brackets 101 by set screws 102. Each of the pipes 100 is capped at one end and at its opposite end is connected to an air pressure supply pipe 103 as shown in Fig. 2. The pipe 100 is provided at spaced intervals along its length with holes or perforations 104 which discharge jets of air against the film or layer 30 at its point of removal from the corresponding drum 20 by the doctor blade 31, as best shown in Fig. 6.

A similar pipe 105 is mounted under the upper end of each shield 38 and is supported by clips 106 from the shield 38 and is supplied with air under pressure from a line 107 and has a series of perforations 108 which discharge toward the edge of the adjacent knife or doctor blade 31 and against the side of the film 30 as it is being removed from the adjacent drying drum 20. Air is blown through the pipe 105 at the start of the drying operation only if necessary to raise the film over the edge of the shield 38 whereupon it can be guided over the reel 40.

To further cool each of the removed films or coatings 30 in its path of travel over the cooling drums 40, a pipe 110 is arranged under each of the cooling drums 40 parallel with its axis and is supported at its opposite ends in arms 111 which depend from the arms 98 fixed to the bearing blocks 70 for the cooling drums, as best shown in Figs. 2 and 3. The arms 111 are preferably adjustable along slots 112 in the arms 98 by means of wing nuts 113 and each pipe 110 is preferably rotatably mounted in its arms 111 and held in position by means of set screws 114, this mounting for the pipes 110 permitting of any desired adjustment of the pipes with reference to the cooling drums 40. Each of the pipes 110 is capped at one end and is supplied with air under pressure through a flexible hose 115 at its opposite end. Each of these pipes is provided along one side with a series of perforations 116 which discharge jets of air against the inner side of the film or sheet of material 30 leaving the cooling cylinder 40. Since the surface of the cooling cylinder 40 is composed of the coarse mesh screen 41, it will be seen that the air discharged from each of the pipes 110 is caused to enter the adjacent cooling cylinder 40 and traverse the space 61 between the cylindrical screen 41 and the inner drum 60, the air stream being confined in this space 61 by the sheet or film 30 passing over the drum. A baffle plate 117 can also be placed below the pipe 110, as indicated in Fig. 6 to insure all of the air issuing from the jets 116 being directed against the film 30 and circular baffle plates 118 can be placed at the opposite ends of the circular space or passage 61, as shown in Fig. 7, to prevent the escape of cooling air from the opposite ends of this space. A stream of cooling air is therefore constrained to move through the passage 61 in counterflow relation to the sheet or film 30 of the material being handled and in direct contact with the inner side of this film.

In the operation of the form of the invention shown in Figs. 1–9, the sheet of material 30 being dried upon each drying drum 20 is assumed to be of a composition which, for one of the various reasons previously discussed, must be cooled quickly so as to become brittle when it reaches the conveyer 35. To facilitate this cooling, each film or sheet of material is passed over the top of the adjacent cooling cylinder 40 which is located at a sufficient elevation that the dry product film is lifted to a higher level than that at which it is removed from the surface of the drum 20 by the doctor blade 31, this cooling cylinder being revolved and the sheet 30 falling from the cooling cylinder 40 being guided into the conveyer trough by the guide rods 95. The location of the cooling cylinder 40 at a distance from the drying drum increases the length of the path of the removed continuous sheet or film of material from its line of removal from the drying drum 20 to the conveyer 35 and hence provides a correspondingly increased length of time for this film to cool. The relatively high elevation of each cooling cylinder 40 further provides a greater area of contact between the removed hot product film and the cooling cylinder 40. Because of this greater area of contact and the fact that the surface of the cooling cylinder 40 is made of a coarse mesh woven wire screen, sufficient traction is obtained between this film and the cooling cylinder to permit the film to be stretched as it leaves the drying drum. With some materials which become brittle rapidly and break quickly it may be desirable, however, to place the cooling cylinder 40 with its top level with the knife 31 and to substitute a softer surface, such as rubber, on the cooling cylinder, this being preferably corrugated to secure the necessary traction. For such use, the cooling pipe 100 is eliminated. Each of the cooling drums 40 is driven at a suitable speed compared to that of the corresponding drying drum 20 so that the film 30 on leaving each drying drum 20 at the edge of its knife or doctor blade 31 is stretched and thereby rendered thinner and capable of being cooled more rapidly.

The guide rods 95 for this stretch of the film 30 serve to in part support the weight of the stretch of film hanging from the cooling cylinder 40 and prevent the weight of the film from tearing the film as it leaves the cooling drum 40. Similarly, the film 30 leaving each drying drum 20 is hot and at this temperature is liable to be torn by the pull of the cooling cylinder 40 in stretching it into an attenuated form at this point. To avoid such tearing the air pipe 100 is provided which directs jets of cooling air against the film 30 at the line of its removal from the corresponding drum 20 from above the shield 38, which shield is provided for the purpose of preventing the hot vapors from rising and reheating the film after being withdrawn from its drying drum. The jets of cool air from the pipe 100 serves to cool the film 30 as a part of its removal from the drying drum 20 and thereby immediately place the film in condition to be stretched slightly by the more rapidly rotating cooling drum 40 without danger of tearing this film.

To further accelerate the cooling of each of the films 30 as it passes through the lengthened path of travel provided by its cooling drum 40, the air pipe 110 is provided which directs jets of cooling air upwardly against that side of the film 30 at the line where it is released from contact with the cooling cylinder 40. This cooling air passes through the coarse mesh screen 41 which forms the exterior surface of the cooling drum and, by the provision of the inner imperforate cylinder 60 of the cooling drum 40, is caused to flow through the passage 61 in direct contact with and in counterflow relation to the film or sheet of material passing over the cooling drum 40. It will therefore be seen that a very substantially increased cooling effect is provided by the jets of air issuing from the pipe 110 in combination with the particular form of cooling drum 40 shown.

In the modified form of the invention shown in Figs. 10–13 the drum dryer 119 is similarly illustrated as having one or more drying drums 120 suitably journaled in upright end standards 121 and 122, the film of material 30 being shown as removed from the outer quarter of each of the drums 120 by a doctor blade 123 and being deposited, after traversing the cooling cylinder 125, into the trough 126 of a screw conveyer 127 into which the film or sheet of material 30 is guided by a side shield 128. The cooling cylinder 125 shown in Figs. 10–13 comprises a cylindrical coarse mesh woven wire screen 130, one end of this cylindrical screen 130 being shown as supported in an end groove 131 of a circular end head 132 which is provided with an axial opening 133 and an annular peripheral rail or track 134. The opposite end of the coarse mesh wire screen 130 is similarly secured to a circular end head 135 having an axial opening and also having a peripheral rail or track 136. The rail or track 134 of the end head 132 is supported by a pair of grooved rollers 140 which are suitably mounted on a bracket 141 secured to the end standard 121 of the dryer. Similarly, the track or rail 136 of the end head 135 is shown as supported upon a pair of grooved rollers 142 suitably mounted on a bracket 143 projecting outwardly from the end standard 122 of the dryer. This roller mounting for the two end heads 132 and 135 of each cooling cylinder permits the cooling cylinder to be freely rotated and the cooling cylinder is shown as being rotated in the direction of the arrow shown in Fig. 10 by an electric motor 145 mounted on the bracket 141 and having a reducing gearing including a sprocket 146 driving a chain 147 which passes around a sprocket ring 148 secured to the circular end head 132 of the corresponding cooling cylinder 125.

Figure 13:
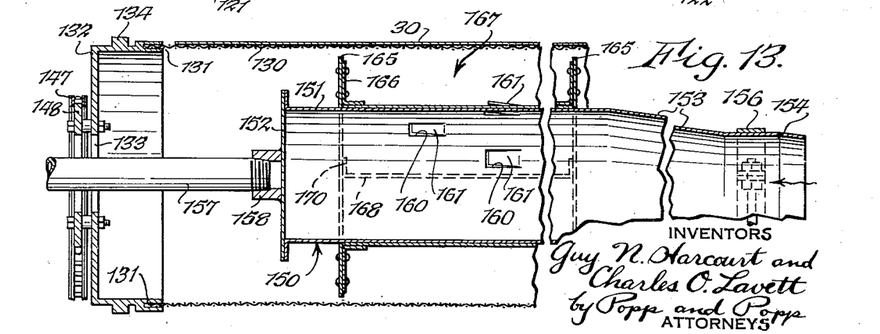
Fig. 13 is an enlarged, fragmentary, longitudinal section taken on line 13—13, Fig. 12.

Air for cooling the stretch of the continuous film of dried material traversing the cooling cylinder 25 is supplied from a stationary pipe within the cooling cylinder, as indicated generally at 150. This pipe 150 is shown as made of a tube of sheet metal 151 which is closed at one end by a circular end plate 152 and is formed at its opposite end to provide a tapering portion 153 leading to a reduced end 154, through which reduced end 154 air is introduced into the pipe. The sheet metal pipe 150 is supported at one end on a standard 155 rising from the supporting bracket 143 and held in position thereon by a clamp 156. At its opposite end the sheet metal pipe 150 is supported by a coaxial pipe 157 which is screwed into a boss 158 secured to the circular end plate 152 of the sheet metal pipe, as best shown in Fig. 13. The free end of the supporting pipe 152 is supported in a socket provided at the upper end of a supporting standard 159 which is suitably secured to the main supporting bracket 141.

The cooling air introduced into the reduced end 154 of the sheet metal pipe 150 is distributed against the underside of the strip or film 30 of material passing over the cooling cylinder 125 through a plurality of openings 160 provided in the upper half only of the sheet metal tubular portion 151 of this sheet metal pipe 150. The material from these openings is shown as struck upwardly to provide baffles 161 which extend in a generally axial direction along the sheet metal pipe 150 and hence tend to deflect the air issuing from the openings 160 lengthwise of the cooling cylinder. Preferably the baffles or deflectors 160 at one side of the sheet metal pipe 150 project toward the corresponding end of the cooling cylinder and the baffles in the opposite half of the sheet metal pipe 150 project in the opposite direction.

To secure the proper movement of the cooling air so discharged into the upper half of the cooling drum and to avoid the ineffectual escape of such cooling air, baffle plates are provided which are preferably arranged as follows:

At each end of the tubular body 151 of the sheet metal air distributing pipe 150 a circular disk 165 is suitably secured to the exterior of the sheet metal body 151 by brackets 166. These disks are slightly smaller than the interior diameter of the cylindrical screen 130 and thereby serve to enclose a cylindrical chamber 167 between the air supply pipe 150 and the cooling cylinder and prevent the direct escape of air from the ends of this chamber. Similarly, to prevent the direct escape of air from the upper half of this chamber into which the air is discharged from the openings 160, horizontal baffle plates 168 are secured to the exterior of the sheet metal tube 151 by flanges 169 and are also secured to the circular end plates 165 by end flanges 170.

It will be seen that with the form of the invention shown in Figs. 10–13 that the air introduced at low pressure through the reduced end 154 of the stationary sheet metal distributing or supply tube 150 is discharged through the openings 160 in the upper half of this tube into the upper half of the space or chamber 167 formed between this sheet metal tube and the cylindrical screen 130. This air is deflected toward opposite ends of the cooling cylinder by the baffles or deflectors 161 which are formed in providing the holes 160 of the sheet metal tube. This air is in part confined by the annular end plates 165 and the horizontal baffles or partitions 168 so that the air so discharged into the upper half of the chamber 167 is forced into direct contact with the sheet or film 30 of material which is drawn over the cooling cylinder 125 in the form of the invention shown in Figs. 1–9. This air is finally discharged through the perforations of the screen 130 at the upper left hand side as viewed in Fig. 12 and thereby discharged under the stretch of the film or sheet of material being dried as it is drawn from the drying drum 120. In other respects the form of the invention operates in the same manner as the form of the invention shown in Figs. 1–9, operating to stretch the film or sheet of material 30 drawn from the drying drums and the air provided through the stationary internal sheet metal pipe 150 in the cooling drum operating to cool this film with the necessary rapidity to insure its being brittle upon reaching the screw conveyer 127.

Figure 14:
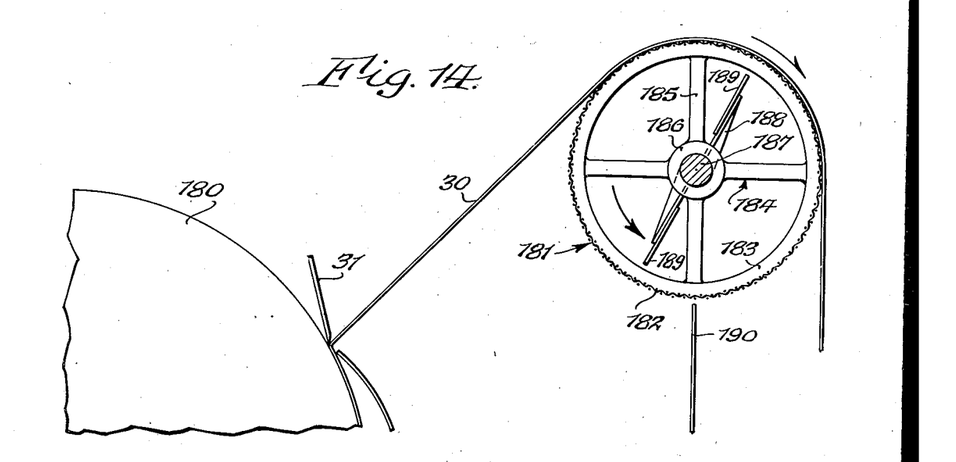
Figs. 14, 15 and 16 are diagrammatic views similar to Fig. 6 and showing different methods for effecting the cooling of the film removed from the surface of the revolving drying drum.
Figure 15:
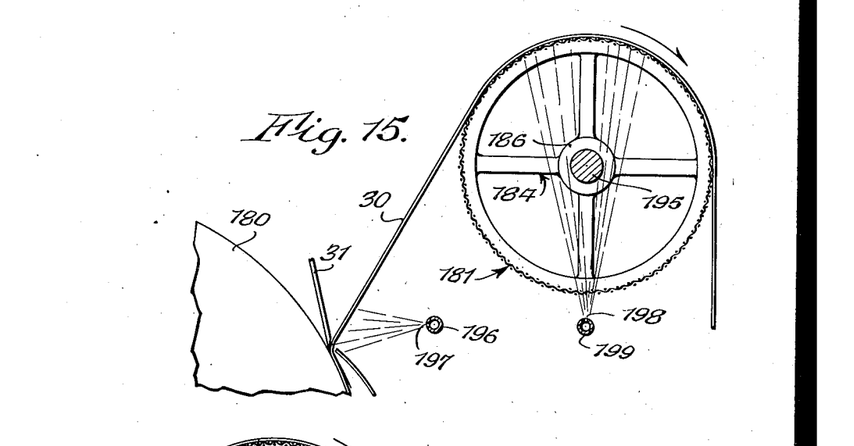
Figure 16:
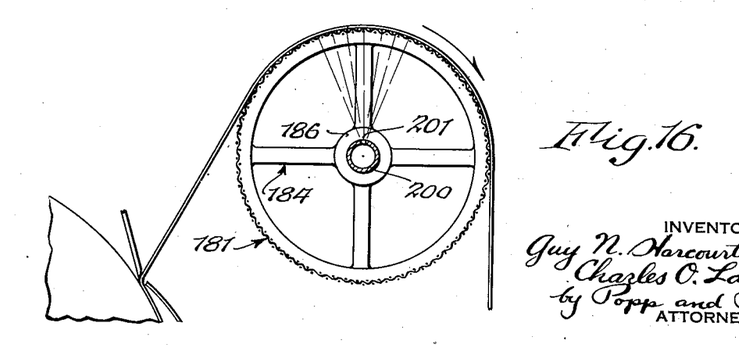

In Figs. 14–16 is illustrated, in diagrammatic form, additional different methods by which air is supplied for cooling the continuous sheet or film 30 while passing over the cooling cylinder in the same manner as with the forms of the invention shown in Figs. 1-13. In these figures the heated rotary drying drum is indicated at 180, the continuous film or sheet of material 30 being removed therefrom by a knife or doctor blade 31 in the same manner as in the forms of the invention shown in Figs. 1-13 and this continuous film or sheet of material being passed over the cooling drum, which is indicated at 181, to be deposited in the usual screw conveyer as with the other forms of the invention. The cooling drum is shown as comprising a cylinder 182 of coarse mesh woven wire screen which is supported in cylindrical form at suitable intervals by the rims 183 of internal supporting wheels or spiders 184 each of which also has a plurality of spokes 185 leading to a hub 186.

In the form of the invention shown in Fig. 14, the hubs 186 of these internal supporting wheels or spiders of the cooling cylinder 181 are supported on a rotating shaft 187 which is rotated at a relatively high rate of speed in the direction of the arrow associated therewith, and the cooling cylinder 181 is rotated at a slightly higher peripheral speed than the drying drum 180 in the opposite direction, as indicated by the arrow. To the rotating shaft 187 are secured a plurality of radially extending arms 188 which support a pair of radially extending fan blades 189, which fan blades extend lengthwise of the cooling cylinder in the spaces determined by the spacing of the internal supporting wheels or spiders 184. It will therefore be seen that these fan blades 182, rotating at a relatively high speed in the opposite direction from the cooling cylinder 181, serve to blow cooling air against the inner side of the film or sheet of material 30 which is being drawn over the cooling drum 181 thereby to accelerate the cooling of this film and condition it for breaking up in the usual screw conveyer. In order to prevent short circuiting of the air so pumped by the fan blades 182, a vertical stationary partition 190 is preferably arranged immediately under the cooling cylinder 181 in axial alignment therewith.

In the form of the invention shown in Fig. 15, the hubs 186 of the internal supporting wheels or spiders 184 of the cooling drum 121 are mounted on a shaft 195 which can be either stationary so as to form a bearing for the hubs 186 or fast to these hubs so as to form a drive shaft for the cooling cylinder, the cylinder being rotated in the direction of the arrow shown at a suitable speed in relation to the drying drum 180. In order to prevent the soft hot film from tearing at the doctor blade 31, a pipe 196 is shown as arranged generally in the same position as the pipe 160 in the form of the invention shown in Figs. 1-9 and having holes or orifices 197 which direct jets of air against the film 30 of dried material along its line of cleavage from the drying drum 180.

In the form of the invention shown in Fig. 15, the cooling of the film 30, while passing over the foraminous cooling cylinder 181, is accelerated by the upwardly directed jets of cooling air issuing from the orifices 198 of a horizontal pipe 199 shown as arranged directly under the axis of rotation of the cooling cylinder 181, although it will be understood that the position of this pipe could be varied as might be desired. It will be seen that the cooling air discharged from this pipe 199 passes through the lower part of the foraminous cooling cylinder and discharges against the film 30 of material in contact with this cylinder so as to accelerate its cooling and place it in condition for convenient handling by the usual screw conveyer as in the other forms of the invention.

In Fig. 16 is illustrated a form of the invention in which the hubs 186 of the internal supporting wheels or spiders 184 are rotatably mounted on a horizontal stationary tube 200, the cooling cylinder 181 being rotated in the direction of the arrow associated therewith and at a suitable speed in relation to the drying drum 180 in the same manner as with the other forms of the invention. In the form of the invention shown in Fig. 16 air under pressure is supplied to the stationary tube 200 and is discharged through a plurality of openings 201 provided in its upper side. The jets of air discharging from these openings 201 impinge against the underside of the film 30 passing over the screen of the foraminous cooling cylinder 181 in the same manner as in the form of the invention shown in Fig. 15 and for the same purpose of accelerating the cooling of this film to insure its being sufficiently brittle to break up in the screw conveyer.

From the foregoing it will be seen that the present invention provides a method and several forms of apparatus for carrying out the method of cooling products removed in continuous sheet form from a hot drying drum which for various reasons must be cooled quickly, the film being conveyed in such manner as to lengthen its path or distance of travel between the line of removal from the hot drying drum and the conveying means for removing the dried material so as to lengthen the time available for cooling and permit the product to attain sufficient brittleness for breaking up in the conveying means. It will further be seen that in the present invention the cooling of this removed film or sheet of dried material is accelerated by the stretching of the film both before and after it contacts with the foraminous cooling cylinder. The present invention also provides several methods of applying a cooling medium, such as cool air, to the film while being conveyed through such lengthened path of travel so as to further accelerate this cooling and obtaining the proper state of brittleness.

We claim as our invention:

1. Apparatus for removing and cooling a continuous film of material of the character described from the surface of a revolving drying drum, comprising a friction cylinder mounted adjacent to and parallel with said drying drum and having its periphery formed to provide a friction face adapted to engage frictionally the film loosely hung upon and engaging an extensive portion of the periphery of the friction cylinder to provide tension in the stretch of said film between said drying drum and friction cylinder, means for driving said friction cylinder at a suitable speed in relation to said drying drum to effect said tension in said stretch of film between said drying drum and friction cylinder through the friction provided between the engaging surfaces of said film and friction cylinder, the stretch of said film leaving said friction cylinder hanging vertically by gravity therefrom, adjustable means for supporting any desired part of the weight of said leaving stretch of film and over which the film moves by gravity, and a receptacle arranged directly under the lower part of said leaving stretch of film and into which said leaving stretch falls by gravity after traversing said adjustable supporting means.

2. Apparatus for removing and cooling a continuous film of material of the character described from the surface of a revolving drying drum, comprising a friction cylinder mounted adjacent to and parallel with said drying drum and having its periphery formed to provide a friction face adapted to engage frictionally the film loosely hung upon and engaging an extensive portion of the periphery of the friction cylinder to provide tension in the stretch of said film between said drying drum and friction cylinder, means for driving said friction cylinder at a suitable speed in relation to said drying drum to effect said tension in said stretch of film between said drying drum and friction cylinder through the friction provided between the engaging surfaces of said film and friction cylinder, the stretch of said film leaving said friction cylinder hanging vertically by gravity therefrom, a generally vertical guide member supported at its upper end adjacent one side of said leaving stretch of film and having its lower part adapted to be moved into the path of said leaving stretch of film, means for securing said guide member at any desired angle to the vertical thereby to adjustably support any desired part of the weight of said leaving stretch of film, and a receptacle arranged directly under the lower part of said leaving stretch and into which said leaving stretch falls by gravity after traversing said adjustable guide member.

3. Apparatus for removing and cooling a continuous film of material of the character described from the surface of a revolving drying drum, comprising a friction cylinder mounted adjacent to and parallel with said drying drum and having its periphery formed to provide a friction face adapted to engage frictionally the film loosely hung upon the friction cylinder to provide tension in the stretch of said film between said drying drum and friction cylinder, means for driving said friction cylinder at a suitable speed in relation to said drying drum to effect said tension in said stretch of film between said drying drum and friction cylinder, the stretch of said film leaving said friction cylinder hanging by gravity therefrom, a supporting rod arranged generally parallel with said drying drum and friction cylinder and supported adjacent one side of said leaving stretch of film, a plurality of guide rods depending from said supporting rod and adapted to be arranged in the path of said leaving stretch of film, means for holding said supporting rod in any desired position of rotation to permit said guide rods to be held in an angular position supporting any desired part of the weight of said leaving stretch of film, and a receptacle arranged below said leaving stretch and into which said leaving stretch falls after traversing said guide rods.

4. Apparatus for removing a continuous film of material of the character described after severance from the surface of a revolving drying drum by a knife, comprising a friction cylinder mounted adjacent to and parallel with said drying drum and at an elevation in which the upper part of said friction cylinder is arranged a substantial distance above said knife to provide an upwardly moving stretch in the film between said knife and friction cylinder in the length of film loosely hung upon the greater part of the surface of said friction cylinder above its axis, and means for driving said friction cylinder at a suitable speed in relation to said drying drum to provide tension in said upwardly moving stretch of film.

5. Apparatus for removing a continuous film of material of the character described after severance from the surface of a revolving drying drum by a knife, comprising a friction cylinder mounted adjacent to and parallel with said drying drum and at an elevation in which the upper part of said friction cylinder is arranged a substantial distance above said knife to provide an upwardly moving stretch in the film between said knife and friction cylinder in the length of film loosely hung upon the greater part of the surface of said friction cylinder above its axis, means for driving said friction cylinder at a suitable speed in relation to said drying drum to provide tension in said upwardly moving stretch of film, the stretch of said film leaving said friction cylinder hanging vertically by gravity therefrom, and a receptacle arranged directly under said leaving stretch and friction cylinder and into which said leaving stretch falls by gravity.

6. Apparatus for removing a continuous film of material of the character described after severance from the surface of a revolving drying drum by a knife, comprising a friction cylinder mounted adjacent to and parallel with said drying drum and at an elevation in which the upper part of said friction cylinder is arranged a substantial distance above said knife to provide an upwardly moving stretch in the film between said knife and friction cylinder in the length of film loosely hung upon the greater part of the surface of said friction cylinder above its axis, means for driving said friction cylinder at a suitable speed in relation to said drying drum to provide tension in said upwardly moving stretch of film, the stretch of said film leaving said friction cylinder hanging vertically by gravity therefrom, adjustable means for supporting any desired part of the weight of said leaving stretch of film and over which the film moves by gravity, and a receptacle arranged directly under the lower part of said leaving stretch of film and into which said leaving stretch of film falls by gravity after traversing said adjustable supporting means.

7. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, and means for circulating a stream of cooling gas through said foraminous cooling cylinder and in direct contact, through the openings of said foraminous cooling cylinder, with the film of material passing thereover.

8. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, means for circulating a stream of cooling gas through said foraminous cooling cylinder and in direct contact, through the openings of said foraminous cooling cylinder, with the film of material passing thereover, comprising a pipe arranged adjacent to and parallel with said foraminous cooling cylinder and having a plurality of side openings, and means for supplying gas under pressure to said pipe to be discharged through said openings against the film of material traversing said foraminous cooling cylinder.

9. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, means for circulating a stream of cooling gas through said foraminous cooling cylinder and in direct contact, through the openings of said foraminous cooling cylinder, with the film of material passing thereover, and means for guiding said stream of cooling gas to travel in a circumferential path through said cooling cylinder and countercurrent to the movement of the film thereover.

10. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, and means for circulating a stream of cooling gas through said foraminous cooling cylinder and in direct contact, through the openings of said foraminous cooling cylinder, with the film of material passing thereover, comprising a pipe arranged under and parallel with said foraminous cooling cylinder and having a plurality of openings in its upper part and arranged in a series extending substantially the full length of said foraminous cooling cylinder, and means for supplying gas under pressure to said pipe to be discharged through said openings against said foraminous cooling cylinder and thence through the openings in said foraminous cooling cylinder to the interior thereof to cool the film passing thereover.

11. Apparatus for removing a continuous film of material of the character described from the surface of a revolving heated drying cylinder, comprising a hollow foraminous cooling cylinder rotatably mounted adjacent to and parallel with said drying drum and on which the film leaving said drying drum is adapted to be loosely hung with the stretch of film on the opposite side of said foraminous cooling cylinder hanging by gravity, means for rotating said foraminous cooling cylinder to convey said film away from said drying drum, and means for circulating a stream of cooling gas through said foraminous cooling cylinder and in direct contact, through the openings of said foraminous cooling cylinder, with the film of material passing thereover, comprising a substantially imperforate cylinder arranged in said foraminous cooling cylinder and forming a circumferential passage between it and said foraminous cooling cylinder, a pipe arranged under and parallel with said foraminous cooling cylinder and adjacent said stretch of film leaving said foraminous cooling cylinder and provided in its upper side with a plurality of openings directed upwardly and toward the line of separation between said foraminous cooling cylinder and said stretch of film leaving said foraminous cooling cylinder and means for supplying gas under pressure to said pipe to be discharged through said openings toward said line of separation and thence through the openings in said foraminous cooling cylinder into said circumferential space provided by said internal imperforate cylinder.

12. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, and means for circulating a stream of cooling gas through said foraminous cooling cylinder and in direct contact, through the openings of said foraminous cooling cylinder, with the film of material passing thereover, comprising a stationary pipe arranged within and parallel with said foraminous cooling cylinder and having a plurality of openings in its upper part, and means for supplying gas under pressure to said pipe to be discharged through said openings upwardly into direct contact with the film passing over said foraminous cooling cylinder.

13. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, and means for circulating a stream of cooling gas through said foraminous cooling cylinder and in direct contact, through the openings of said foraminous cooling cylinder, with the film of material passing thereover, comprising a stationary pipe arranged within and parallel with said foraminous cooling cylinder and having a plurality of openings in its upper part, means for supplying gas under pressure to said pipe to be discharged through said openings upwardly into direct contact with the film passing over said foraminous cooling cylinder, and baffle means carried by said pipe and extending into the space between said pipe and said foraminous cooling cylinder and confining said discharged gas to traverse a predetermined path before escaping from said foraminous cooling cylinder.

14. Apparatus for removing a continuous film of material of the character described from the surface of a revolving heated drying drum, comprising a hollow foraminous cooling cylinder rotatably mounted adjacent to and parallel with said drying drum and on which the film leaving said drying drum is adapted to be loosely hung, means for rotating said foraminous cooling cylinder to convey said leaving stretch of film away from said drying drum, and means for circulating a stream of cooling gas through said foraminous cooling cylinder and in direct contact, through the openings of said foraminous cooling cylinder, with the film of material passing thereover, comprising a sheet metal stationary pipe arranged within and parallel with said foraminous cooling cylinder and having a plurality of pieces struck upwardly from its upper side to provide openings and deflectors, means for supplying gas under pressure to said pipe to be discharged through said openings, against said deflectors and thence into direct contact with the film passing over said foraminous cooling cylinder, end disks carried by said sheet metal pipe and projecting outwardly therefrom toward said foraminous cooling cylinder to reduce the escape of said gas from the ends of said foraminous cooling cylinder and a baffle plate arranged axially of said pipe and projecting outwardly from one side thereof toward said foraminous cooling cylinder to compel said discharged gas to traverse a predetermined path before escaping from said foraminous cooling cylinder.

15. Apparatus for removing and cooling a continuous film of material of the character described after severance from the surface of a revolving heated drying drum by a knife, comprising a friction cylinder mounted adjacent to and parallel with said drying drum and at an elevation in which the upper part of said friction cylinder is arranged a substantial distance above said knife to provide an upwardly moving stretch in the film between said knife and friction cylinder and in the length of film loosely hung upon the greater part of the surface of said friction cylinder above its axis, means for driving said friction cylinder at a suitable speed in relation to said drying drum to provide tension in said upwardly moving stretch of film and means for directing jets of cooling gas against said upwardly moving stretch of film.

16. Apparatus for removing and cooling a continuous film of material of the character described after severance from the surface of a revolving heated drying drum by a knife, comprising a friction cylinder arranged adjacent to and parallel with said knife and having its periphery formed to provide a friction face adapted to engage frictionally the film loosely hung upon the friction cylinder to provide tension in the stretch of said film between said drying drum and friction cylinder, means for driving said friction cylinder at a suitable speed in relation to said drying drum to effect said tension in said stretch of film between said drying drum and friction cylinder and vertically guided supporting means for said friction cylinder and permitting said friction cylinder to be readily elevated to afford access to said knife.

17. Apparatus for removing and cooling a continuous film of material of the character described after severance from the surface of a revolving heated drying drum by a knife, comprising a friction cylinder arranged adjacent to and parallel with said knife and having its periphery formed to provide a friction face adapted to engage frictionally the film loosely hung upon the friction cylinder to provide tension in the stretch of said film between said drying drum and friction cylinder, means for driving said friction cylinder at a suitable speed in relation to said drying drum to effect said tension in said stretch of film between said drying drum and friction cylinder and vertically guided supporting means for said friction cylinder and permitting said friction cylinder to be readily elevated to afford access to said knife, comprising end bearing blocks supporting said cylinder, stationary posts adjacent said end bearing blocks and formed to provide vertical guideways in which said end bearing blocks ride, a pulley at the upper end of each of said posts, a cable connected with each of said end bearing blocks and passing over the corresponding pulley, a counterweight on the opposite end of each of said cables and means for clamping each bearing block at any desired position along its post.

18. The method of removing and cooling a continuous film of material of the character described after severance from the surface of a revolving heated drying drum by a knife, which comprises hanging the strip severed by said knife upon a cooling cylinder in frictional engagement with the greater part of the peripheral surface of said friction cylinder above its axis and with its end overhanging said cooling cylinder to provide an end hanging from said cooling cylinder, and rotating said cooling cylinder at a suitable speed in relation to said drying drum to provide tension in the stretch of film at said knife and between said drying drum and cooling cylinder through the friction provided between the engaging surfaces of said film and friction cylinder.

19. The method of removing and cooling a continuous film of material of the character described after severance from the surface of a revolving heated drying drum by a knife, which comprises hanging the strip severed by said knife upon a cooling cylinder in frictional engagement with the greater part of the peripheral surface of said friction cylinder above its axis and with its end overhanging said cooling cylinder to provide an end hanging from said cooling cylinder, rotating said cooling cylinder at a suitable speed in relation to said drying drum to provide tension in the stretch of film at said knife and between said drying drum and cooling cylinder through the friction provided between the engaging surfaces of said film and friction cylinder and applying jets of cooling gas immediately adjacent said knife to that surface of said film which contacts said cooling drum and immediately following the severance of said film from said drying drum.

20. Apparatus for removing a continuous film of material of the character described after severance from the surface of a revolving drying drum by a knife, comprising a friction cylinder mounted adjacent to and parallel with said drying drum and having its periphery formed to provide a friction face upon which said film is loosely hung to engage the greater part of the peripheral surface of said friction cylinder above its axis, and means for driving said friction cylinder at a suitable speed in relation to said drying drum to provide tension in the stretch of film between said drying drum and friction cylinder through the friction provided between the engaging surfaces of said film and friction cylinder.

21. Apparatus for removing a continuous film of material of the character described after severance from the surface of a revolving drying drum by a knife, comprising a hollow friction cylinder mounted adjacent to and parallel with said drying drum and having its periphery formed to provide a foraminous friction face upon which said film is loosely hung to engage the greater part of the peripheral surface of said friction cylinder above its axis, and means for driving said friction cylinder at a suitable speed in relation to said drying drum to provide tension in the stretch of film between said drying drum and friction cylinder through the friction provided between the engaging surfaces of said film and friction cylinder.

GUY N. HARCOURT.
CHARLES O. LAVETT.